United States Patent [19]
Williams, Jr. et al.

[11] Patent Number: 5,470,032
[45] Date of Patent: Nov. 28, 1995

[54] AIRBORNE MONITORING SYSTEM AND METHOD

[76] Inventors: Joseph B. Williams, Jr., 153 Shewell Ave., Doylestown, Pa. 18901; Marvin B. Sullivan, 814 Boca Ciega Isle, St. Pete Beach, Fla. 33706

[21] Appl. No.: 229,465

[22] Filed: Apr. 18, 1994

[51] Int. Cl.⁶ ................................. B64B 1/44
[52] U.S. Cl. ............ 244/1 TD; 244/24; 244/31
[58] Field of Search ................ 244/1 TD, 24, 244/31, 33

[56] References Cited

U.S. PATENT DOCUMENTS

| | | |
|---|---|---|
| Re. 26,427 | 7/1968 | Jalbert . |
| Re. 31,205 | 4/1983 | Jalbert . |
| 999,469 | 8/1911 | Schütte ........................... 244/31 |
| 1,430,868 | 10/1922 | Weyrick ...................... 244/31 X |
| 2,151,336 | 3/1939 | Scharlau . |
| 2,366,423 | 1/1945 | Pear, Jr. . |
| 2,681,774 | 6/1954 | Winzen et aL. ................ 244/31 |
| 3,131,894 | 5/1964 | Jalbert . |
| 3,176,935 | 4/1965 | White et al. .................. 244/31 |
| 3,285,546 | 11/1966 | Jalbert . |
| 3,318,553 | 5/1967 | Ross ............................. 244/33 |
| 3,340,732 | 9/1967 | Scoggins . |
| 3,420,100 | 1/1969 | DuBois . |
| 3,620,486 | 11/1971 | Charpentier et al. ........... 244/33 |
| 3,680,519 | 8/1972 | Jalbert . |
| 4,270,714 | 6/1981 | Jalbert . |
| 4,465,010 | 8/1984 | Jalbert . |
| 4,729,530 | 3/1988 | Jalbert . |
| 4,842,219 | 6/1989 | Jakubowski et al. . |
| 4,930,726 | 6/1990 | Jalbert . |
| 4,956,646 | 9/1990 | Miller et al. . |
| 5,115,997 | 5/1992 | Peterson . |
| 5,174,529 | 12/1992 | Jalbert . |

*Primary Examiner*—William Grant
*Attorney, Agent, or Firm*—Howson and Howson

[57] ABSTRACT

An airborne monitoring system for measuring conditions in the lower atmospheric boundary layer of a tropical cyclone or other concerted atmospheric systems. The system flies on the wind. In the case of a tropical cyclone it flies over the sea, into the eye and tracks the storm, transmitting meteorological data and receiving commands from a remote base station. The system includes a hybrid lifting body tethered from a line contacting the surface of the sea. It is maintained in aerodynamic and hydrodynamic balance at a substantially constant altitude.

18 Claims, 6 Drawing Sheets

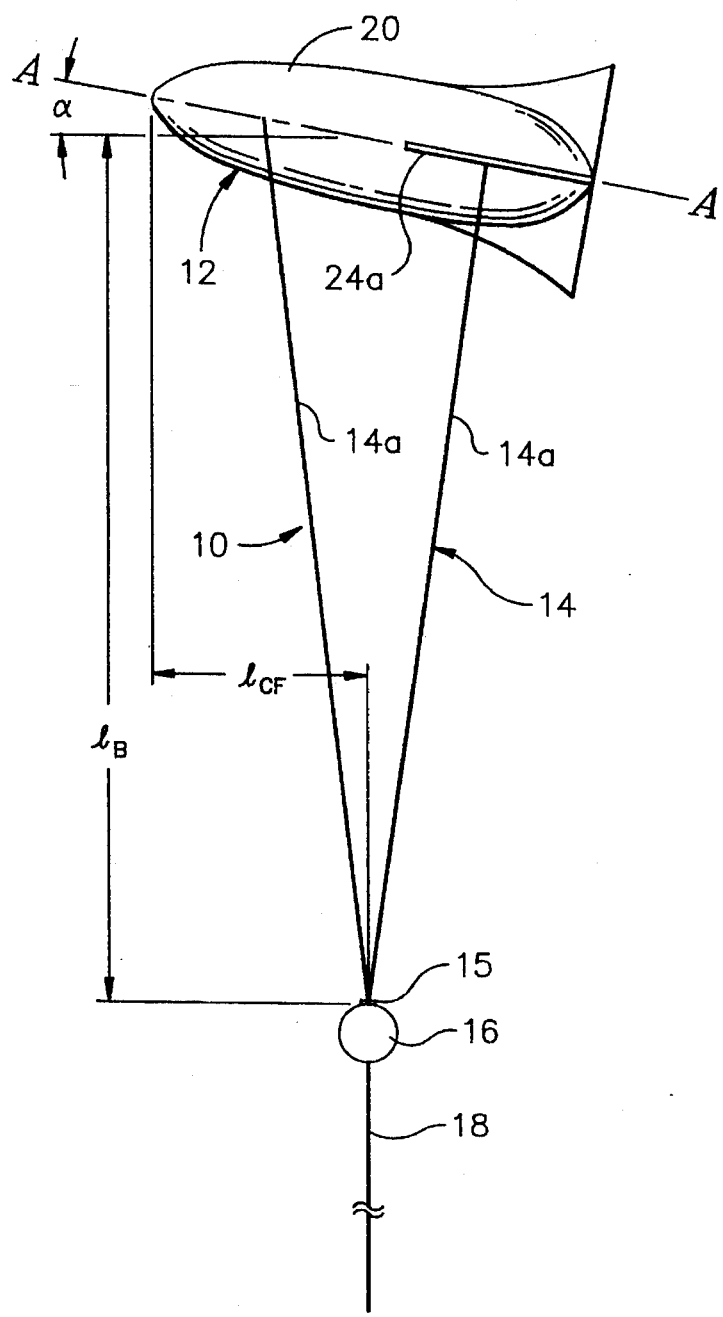
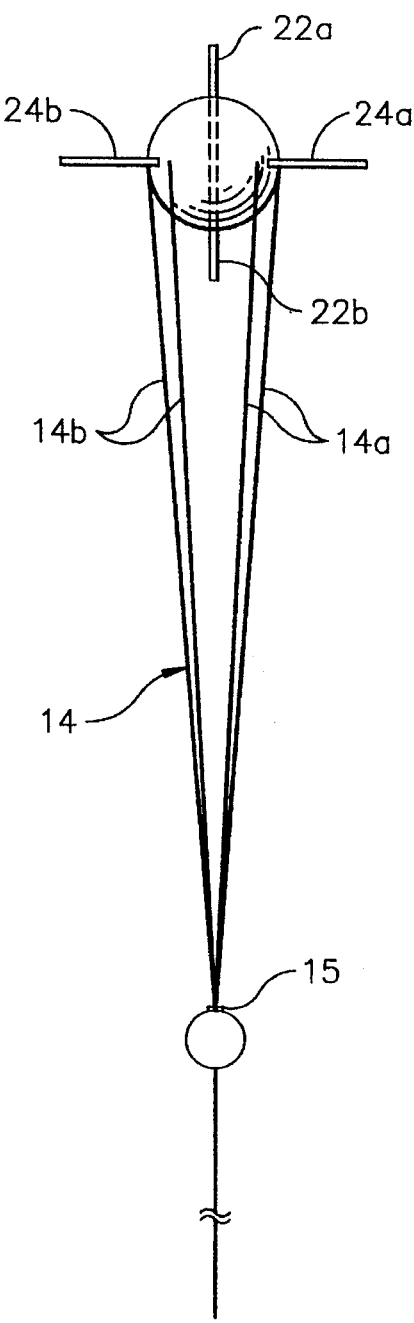
Fig.1
Fig.2

AIRBORNE MONITORING SYSTEM AND METHOD

BACKGROUND OF THE INVENTION

The present invention relates generally to airborne monitoring systems, and more particularly to a novel and improved unpowered airborne data collection system and method especially suitable for observing tropical cyclones and other meteorological, environmental, radiological and surveillance phenomena in the lower atmospheric boundary layer.

Tropical cyclones are one of nature's most devastating phenomena. Approximately 100 tropical cyclones, with hurricane force winds, occur each year causing an average of 20,000 deaths and six to seven billion dollars in economic loss. For instance, winds associated with Hurricane Andrew in 1993 resulted in damage to areas of southern Florida and Louisiana of over twenty billion dollars. Tropical cyclones occur over warm ocean waters in the tropics, and are called hurricanes if they form in the West Indies, and typhoons if they form in the Pacific Ocean. In the case of a hurricane, the center or eye travels from 10 to 30 miles per hour slowly westward at first, then picks up speed and turns toward the pole, and finally eastward as it reaches more temperate latitudes.

Tropical cyclones are characterized by a wind pattern which spirals inward with a negative pressure gradient (rotating counterclockwise in the Northern Hemisphere) reaching wind speeds of 110 to 200 mph immediately outside a relatively calm eye region about 20 miles across. The wind speed typically decreases to under 10 mph on transition through the wall of the eye. Intense convective activity and precipitation occur in spiral rain bands within 60 miles of the eye and, on land fall, produce tidal waves and severe thunderstorms which frequently spawn tornados.

Accurate continuous monitoring of tropical cyclone eye location, speed and direction of travel, central barometric pressure, and wind speed at the eye wall are critical for predicting storm intensity prior to landfall. These observations have been carried out in situ by manned hurricane-tracking aircraft, and remotely by free-floating balloons and satellite systems. While aircraft can provide essential atmospheric data, they entail some risk to its crew and are normally limited to altitudes at or above the boundary layer of the sea-air interface (approximately 1000 meters). In addition, they have limited on-station time, and at $20,000 to $30,000 per sortie, are prohibitively too expensive for many tropical cyclone-intense countries of the world.

Satellites provide excellent tracking data but rely on pattern recognition techniques that are subject to large random and systematic errors. Even though ground-truth measurements may significantly enhance the information obtained from the satellite imagery they cannot provide reliable local atmospheric conditions in the atmospheric boundary layer.

Free-floating balloons, also referred to as hurricane beacons, are designed to be released in the eye of a tropical cyclone, float with the eye at a predetermined level, and transmit observed data by radio signals. Due to extreme variations and wind conditions, they are incapable of maneuvering themselves from the periphery of the tropical cyclone into the eye or of maintaining a constant altitude in the lower atmospheric boundary layer.

If meteorological measurements from the eye of a tropical cyclone at near-surface altitudes of 800 to 1000 feet were possible, the intensity could be forecasted with a high confidence level thereby avoiding unnecessary evacuations for public safety and the production losses that may follow. However, such near-surface weather data within the core of tropical cyclones has not been readily available to meteorologists, the most important data being tropical cyclone eye location, speed and direction of travel, central barometric pressure, and wind speeds at the eye wall. If only the vicinity around the eye of a tropical cyclone were not such a violent region, a variety of robust surface and heavier-than-air vehicles could directly penetrate the eye of the storm at a low altitude, travel with the storm and broadcast the data.

Heretofore, prior art systems have been incapable of providing such a low-level track for continuously observing the intensity of tropical cyclones in real time without imposing severe limits on the system's endurance. Consequently, there is a need for an inexpensive in situ sensor platform which can sustain itself at low relative velocities and lower stresses by riding with the local near-surface flow pattern of a tropical cyclone.

SUMMARY OF THE INVENTION

Accordingly, it is an object of the present invention to provide an improvement in airborne data collection systems operating in the lower atmospheric boundary layer.

Another object of the invention is to provide a meteorological monitoring system which is deployable in winds associated with a tropical cyclone and which travels inwardly to the eye for tracking the course of the tropical cyclone in the lower atmospheric boundary layer as conditions are measured and transmitted to, and commands received from, a remote station.

Another object of the invention is to provide a tethered hybrid lifting body which will maintain a substantially constant altitude within wide variations of wind speeds.

Still another object of the invention is to provide a hybrid sea-air system for measuring and transmitting meteorological conditions and sea surface data in the lower atmosphere boundary layer of a tropical cyclone or other concerted atmospheric systems.

A further object of the invention is to provide a simple and economical method of measuring lower atmospheric boundary layer meteorological conditions of a tropical cyclone or other concerted atmospheric conditions.

A further object of the invention is to provide a novel method of fabricating an inflatable, streamlined envelope for a lifting body.

A still further object of the present invention is to provide reliable low-cost airborne monitoring system which utilizes high strength, lightweight materials, and which is easily deployable in severe weather conditions.

Briefly, these and other objects of the present invention are accomplished in an airborne monitoring system which includes a hybrid lifting body and tether. In one embodiment, the lower end of the tether is free to drag on the surface of the sea, land, or ice as the lifting body travels on the wind. The system carries an electronic payload which measures and transmits meteorological data to a remote receiving station. The windfoil is launched on lower atmospheric boundary layer winds associated with a tropical cyclone. It transits into the eye of the tropical cyclone, and tracks the course of the eye as the storm moves. The lifting body, payload, and tethered line design parameters determine, by a balance of vertical and horizontal forces, the configuration necessary for maintaining the payload at a substantially constant altitude within wide variations in wind velocity. An alternate embodiment provides a lifting body which is tethered at a substantially constant altitude within wide variations in wind speed by a long tether from a ground or similar surface position.

BRIEF DESCRIPTION OF THE DRAWINGS

The foregoing and other objects, features and advantages of the invention will become more apparent from the following description, when taken in conjunction with the accompanying drawings wherein:

FIG. 1 is a side view in elevation of one embodiment of an airborne monitoring system according to the invention for tracking and observing meteorological conditions in the lower atmospheric boundary layer of a tropical cyclone;

FIG. 2 is a frontal view of the system taken along the axis A—A of FIG. 1;

DESCRIPTION OF THE PREFERRED EMBODIMENTS

Figure 3:
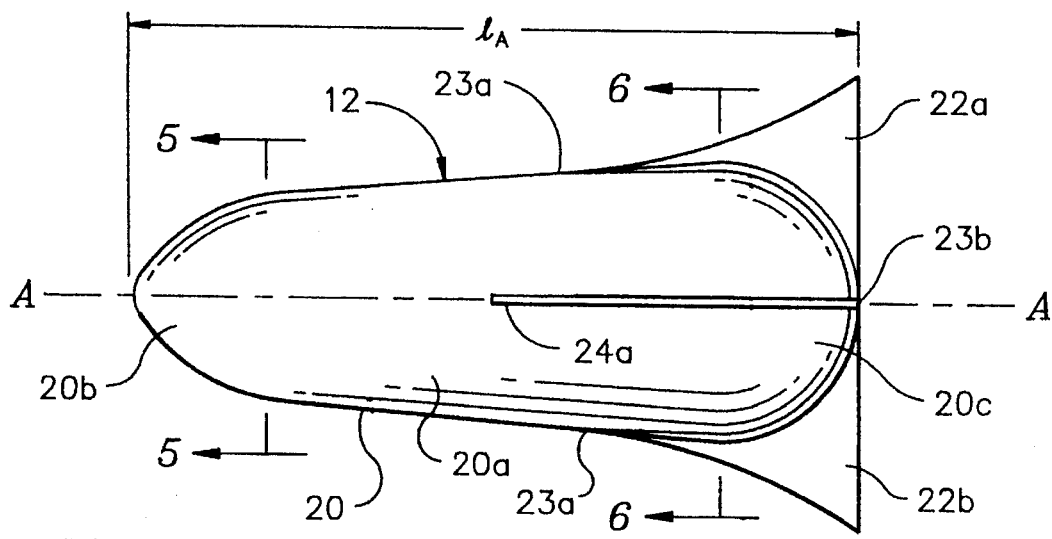
FIG. 3 represents a more detailed side view of an inflated hybrid lifting body employed in the system of FIG. 1.
Figure 4:
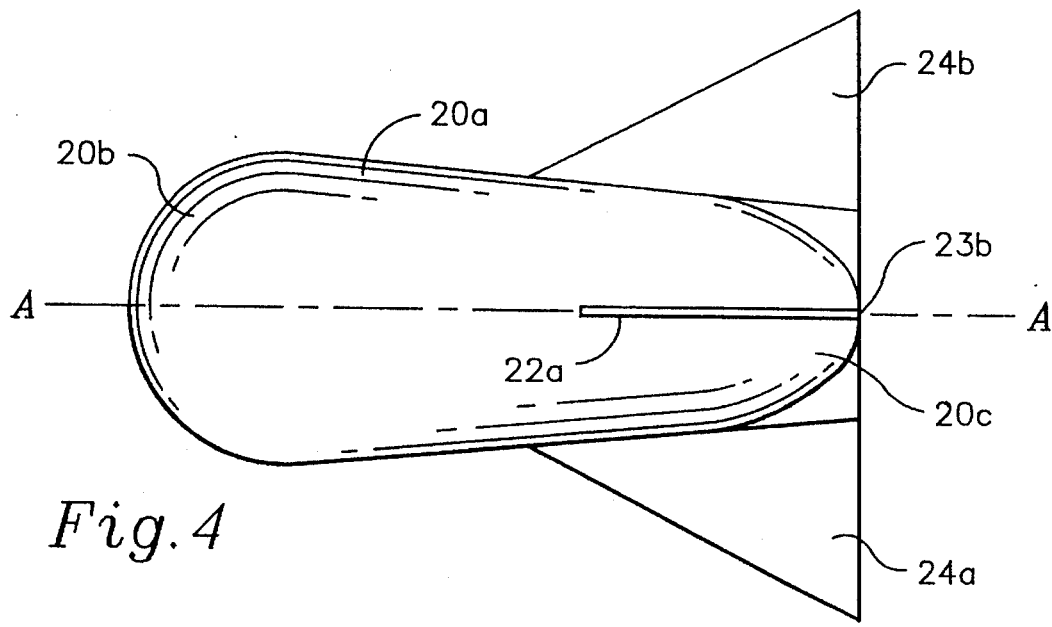
FIG. 4 is a top view of the lifting body of FIG. 3.

Referring now to the drawings wherein like reference characters denote like or corresponding parts throughout the several views, there is shown in FIGS. 1 and 2 an airborne monitoring system 10 according to the invention for measuring lower atmospheric boundary layer conditions in a tropical cyclone. In general, the system comprises a helium-filled hybrid lifting body 12, a bridle 14, an electronic module 16, and a long lightweight cord or tether 18. The helium keeps the lifting body aloft under no-wind conditions.

Figure 5:
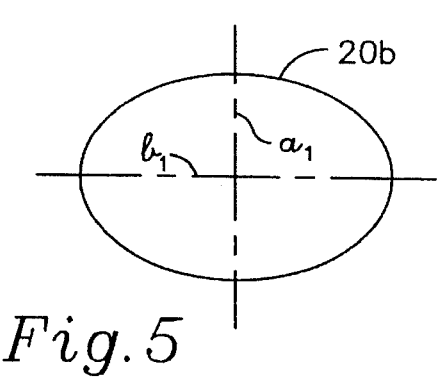
FIG. 5 is a cross-sectional view of the lifting body taken along the line 5—5 of FIG. 3.
Figure 6:
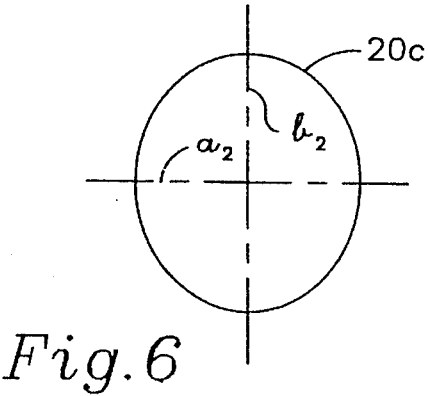
FIG. 6 is a cross-sectional view of the lifting body taken along the line 6—6 of FIG. 3.

As better shown in FIGS. 3–6, lifting body 12 includes a streamlined, helium-inflated envelope 20 with a mid-section 20a of uniform circumference along a longitudinal axis A—A coaxially aligned between oblate spheroidal nose and tail sections 20b and 20c, respectively. Sections 20b and 20c smoothly intersect the opposite ends of section 20a to form oval circumferences in planes normal to axis A—A, as shown in FIGS. 5 and 6. The major axis $b_1$ of nose section 20b lies in a horizontal plane through axis A—A, to provide horizontal stability and lift; and the major axis $b_2$ of tail section 20c lies in a vertical plane through axis A—A to provide vertical stability in yaw.

Figure 7A:
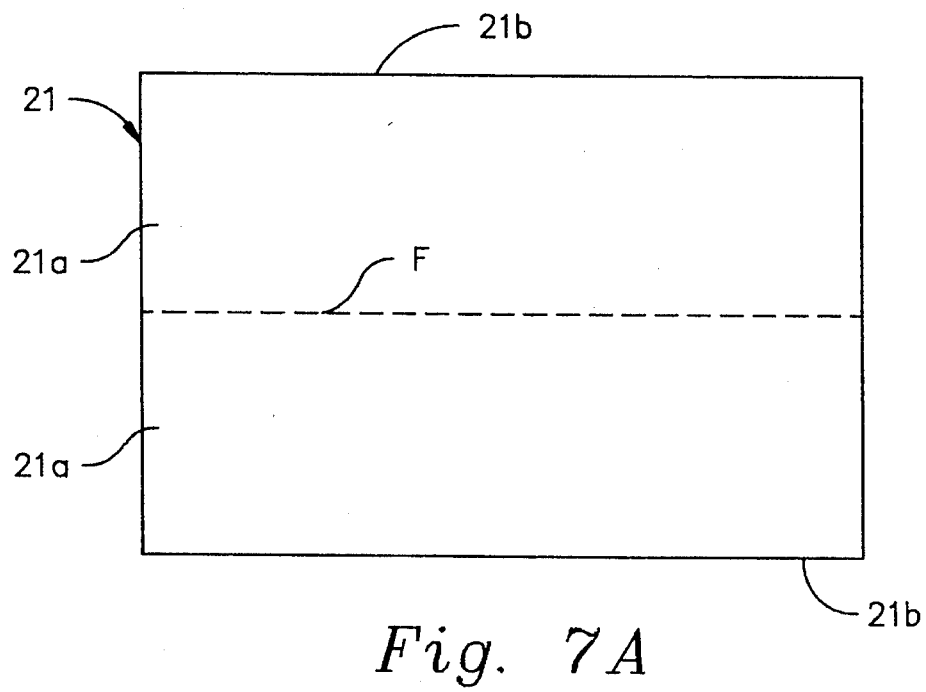
FIGS. 7a, 7b and 7c illustrate a method for forming an inflatable envelope for the lifting body of FIG. 3.
Figure 7B:
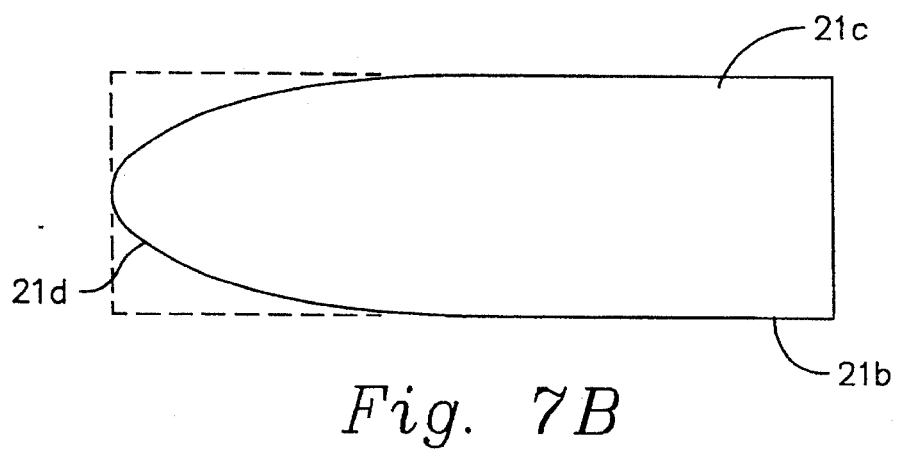
Figure 7C:
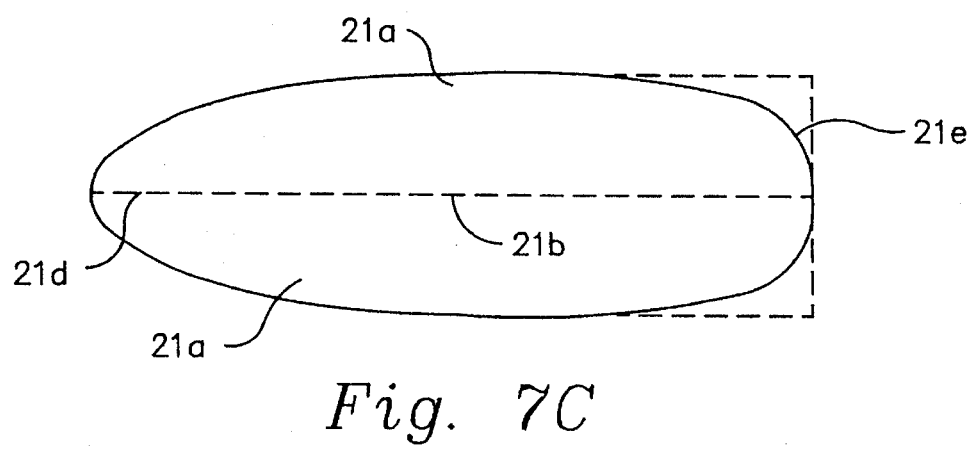

Envelope 20 is preferably constructed of a single sheet of thin-film, gas-impermeable single or multilayered plastic 21, such as Mylar®, of length and width substantially corresponding to the design length and circumference of envelope 20. The sheet is first folded in half along line F to form adjacent rectangular flat sides 21a (FIG. 7a) and the flat sides at one end are rounded off and the meeting lengthwise and arcuate edges 21b and 21d are sealed together forming a sleeve 21c and nose section 20b (FIG. 7b). The other end of the sleeve is then refolded lengthwise along the middle of the flat sides, rounded off and the meeting arcuate edges 21e sealed (FIG. 7c). When inflated, the curvatures of the sealed edges 21d and 21e produce oval areas of cross section in planes normal to axis A—A as shown in FIGS. 5 and 6. The area where section 20a intersects nose section 20b is larger than the area where it intersects section 20c in order to produce a greater buoyancy in the forward end. The acuity of curvature at the nose and tail ends determines areas and major-to-minor ratios $b_1/a_1$ and $b_2/a_2$ of nose and tail sections 20b and 20c. In an actual construction of an envelope 20 with a length $l=13.15$ ft. and a midsection circumference $C=14.92$ ft., preferred ratios are $b_1/a_1=1.36$ and $b_2/a_2=1.40$ for the nose and tail sections, respectively, and a length-to-tail section major axis ratio $l/b_1=5.1$.

Dorsal and ventral fins 22a and 22b are longitudinally fixed to the upper and lower tail surfaces of envelope 20 between fore and aft points 23a and 23b, respectively, to supplement the vertical stabilizing effect of tail section 20c. Delta wings 24a and 24b longitudinally attach to the sides of envelope 20 at aft point 23b and supplement the lift of nose section 20b. The fins and wing are generally triangular and constructed of a thin-film plastic sheet, such as Kevlar® reinforced with Mylar®, stretched within lightweight rigid frames 25 constructed of carbon fibers. Dimensions of fins 22a and 22b, for the actual construction are: length=4.5 ft., and height (at tail end)=4.0 ft. The wing span-to-length ratio (effective span$^2$/effective area) is 0.78 for a wing length= 6.04 ft., total span=10.30 ft., delta wing aspect ratio=2.0 and sweep angle=63.4°.

Referring again to FIGS. 1 and 2, bridle 14 consists of shroud lines 14a and 14b which converge and attach to a slide fastener 15 carried by module 16. The ends of lines 14a and 14b attach to opposite sides of envelope 20 approximately where nose and tail sections 20b and 20c intersect section 20a. Forward segments of lines 14a and 14b are longer than their aft segments to provide lifting body 12 with a substantially constant angle of attack α. Fastener 15 allows the relative lengths of the forward and aft segments to be adjusted for aerodynamic trim. In the actual construction, the bridle-to-envelope length ratio $l_B/l_A=2.28$, and the confluence-to-bridle length ratio $l_{CF}/l_B=0.34$. For a nominal bridle length of 30 ft., these ratios determine the lengths of the forward and aft segments as 28.08 ft. and 26.5 ft., respectively, for an angle of attack α=15°. The lines are fabricated of a convenient lightweight woven cord, such as Kevlar® or Spectra® having a specific gravity less than one when saturated in sea water.

Tether 18 also consists of a woven cord like bridle 14 to ensure that any portion deployed in the sea will float. In a manner described hereinbelow, a given weight per unit-length, drag coefficient in air and water, and the amount of tether exposed in the air and the amount floating on the sea surface determines the altitude at which system will achieve a force balance. The actual construction uses a tether length $l_t$=2000 feet for maintaining system in a force balance at approximately 800 to 1000 feet above the sea.

Figure 8:
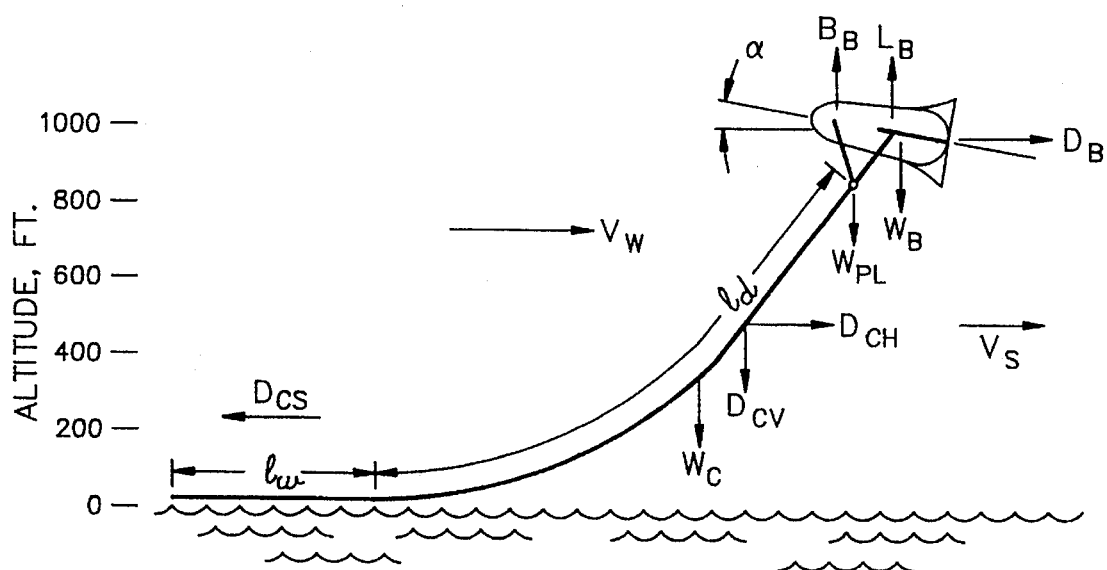
FIG. 8 is a schematic view in elevation of the airborne monitoring system of FIG. 1 deployed in a tropical cyclone with principal forces acting on the system.

The monitoring system 10 is an autonomous "wind rider" which is maintained in aerodynamic balance by the weight of the tether and the aerodynamic and hydrodynamic forces applied thereto. In order for the system to fly on the winds of tropical cyclones and other concerted atmospheric systems, these forces and various performance parameters are considered. FIG. 8 shows these forces and parameters which are further defined as follows:

$V_W$ = wind speed $V_S$ = system speed $V_R = V_W - V_S$ $\rho_a$ = air density $\rho_{SW}$ = seawater density $\rho_{He}$ = helium density $V_e$ = volume of envelope $B_B$ = buoy force on envelope $W_B$ = weight of lifting body $S$ = lifting body; wing area $C_{LB}$ = lift coefficient $C_{DB}$ = drag coefficient $C_{DC}$ = drag coefficient of tether $L_B$ = net lift $D_B$ = net drag $D_{CV}$ = vertical component of tether drag in air $D_{CH}$ = horizontal component of tether drag in air $W_C$ = weight of dry tether ($\omega l_d$)

$W_{PL}$ = weight of payload $D_{CS}$ = drag of tether in sea $l_t$ = total length of tether $l_d$ = length of tether in air $l_w$ = length of tether in sea $d$ = diameter of tether $\gamma$ = angle of tether with horizontal $l_w$ = tether weight per unit length $K$ = drag ratio where $L_B = \rho_a V_R^2 C_{LB} S$, $D_B = \rho_a V_R^2 C_{DB}$ (referred to wing area), $D_{CS} = \rho_{SW} V_R^2 C_{DC} d l_w$, $$l_w = \frac{\left(1 - \frac{V_s}{V_w}\right)^2}{\left(\frac{V_s}{V_w}\right)} \cdot \frac{\rho_a C_{DB} S}{\rho_s C_{DC} \gamma} \text{, and}$$

$K = D_{CS}/(D_B + D_{CH})$.

The basic equations for the system balance of forces in the vertical and horizontal directions are as follows:

vertical: $B_{net} + L_B - D_{CV} - W_C = 0$ \hfill (1)

horizontal: $D_B + D_{CH} - D_{CS} = 0$ \hfill (2)

where: $B_{net} = B_B - W_{PL} - W_B$

When the forces are replaced with their functional forms, a relationship between system design parameters and performance (speed and altitude) obtains. The horizontal and vertical drag components $D_{CH}$ and $D_{CV}$ are complex integral functions of $V_R$, $\rho_a$, $\gamma$ and $l_t$. Consequently, equations (1) and (2) may be treated numerically. However, a good first-order approximation for system performance can be achieved by assuming $D_{CH}$ and $D_{CV}$ are each equal to zero. This assumes that the drag $D_B$ of envelope 20 is much greater than the drag $D_{CH}$ of the dry tether 18, and that the dry tether will hang as a catenary under its own weight. Represented in hyperbolic functions, the basic equations reduce to a fourth order algebraic equation defining the system-to-wind speed ratio $V_S/V_W$ in terms of the design parameters. By solving equations (1) and (2) simultaneously, the governing equation becomes:

$$z^4 - 2z^3 + (1 + a + b)z^2 - 2az + a = 0 \quad (3)$$

where: $z = V_s/V_w$, $$a = \frac{2\omega}{\rho_s C_{DC} d_w^2} \cdot \frac{1}{L/D},$$

$$b = \frac{2(B_{net} - \omega l_t)}{\rho_w C_{LB} S V_w^2}, \text{ and}$$

$L/D = C_L/C_D$.

Solving equation (3) for its real roots provides a relationship for system speed $V_S$ as a function of the design parameters. That is, $V_S/V_W = f[V_W, L/D, C_{DC}, d, \omega, B_{net}, l_t, C_{LB}, S]$ Under these assumptions, the envelope altitude h can be expressed as follows:

$$h = D_{CS} \left\{ \cosh\left[\sinh^{-1}\left(\frac{B_{net} + L_B\left(1 - \frac{V_s}{V_w}\right)^2}{D_B\left(1 - \frac{V_s}{V_w}\right)^2}\right)\right] - 1 \right\} \quad (4)$$

Even the simplified form of equation (4) is rather complex, but it demonstrates the design process.

Typically, the net buoyant force $B_{net}$ is selected to ensure electronic module 16 remains at a specified altitude in no-wind conditions, i.e. $V_W$=0. Selecting a value for $B_{net}$ dictates the envelope volume $V_e$ for given module and envelope weights $W_{PL}$ and $W_B$. For a desired monitoring system speed $V_S$ and altitude h in a given wind speed $V_W$, an iteration on the remaining parameters can be performed to optimize the system. The parameters S, L/D, $C_{LB}$ and $C_{DB}$ determine the configuration of the wing/envelope; and d, $\omega$ and $l_t$ determine the tether requirements.

Figure 9:
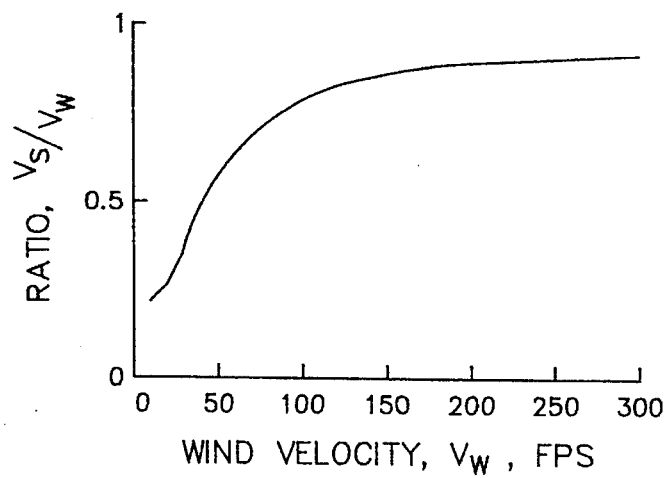
FIGS. 9 and 10 show typical aerodynamic performance characteristics of the system of FIG. 1 designed according to the invention.
Figure 10:
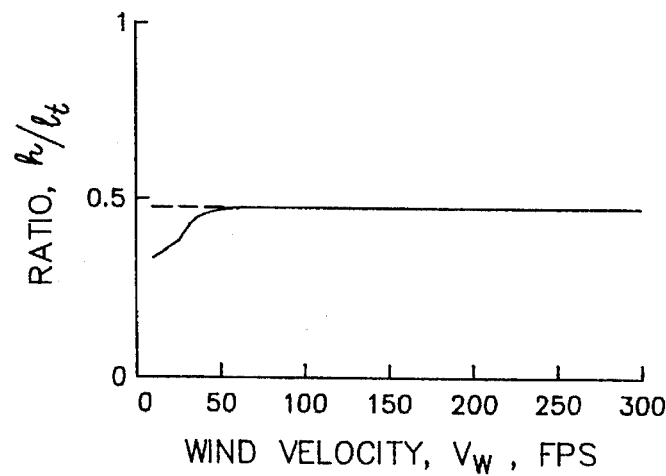

Typical system performance, in terms of the speed ratio $V_S/V_W$ and altitude ratio $h/l_t$, have been computed according to equations (3) and (4) and are graphically shown in FIGS. 9 and 10 as functions of wind speed $V_W$. For wind speeds $V_W$ in excess of 70 fps, the system speed $V_S$ asymptotically approaches about 85% of $V_W$, and altitude h asymptotically approaches about 47% of the tether length, thus demonstrating that the design speed and altitude of the system can be definitized. Of course, different asymptotic values of $V_S/V_W$ and $h/l_t$ may be achieved by changing the parameters of tether 18, and any reasonable payload weight can be lifted by changing the envelope volume $V_e$ and wing area S.

Figure 11:
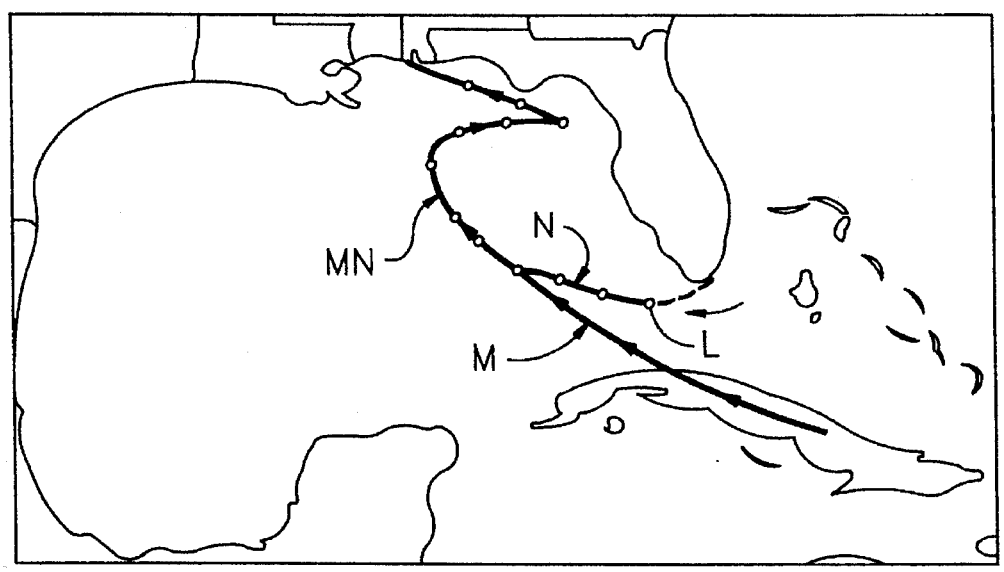
FIG. 11 is a map showing a system according to the invention intercepting and tracking the path of a tropical cyclone in the Gulf of Mexico.
Figure 12:
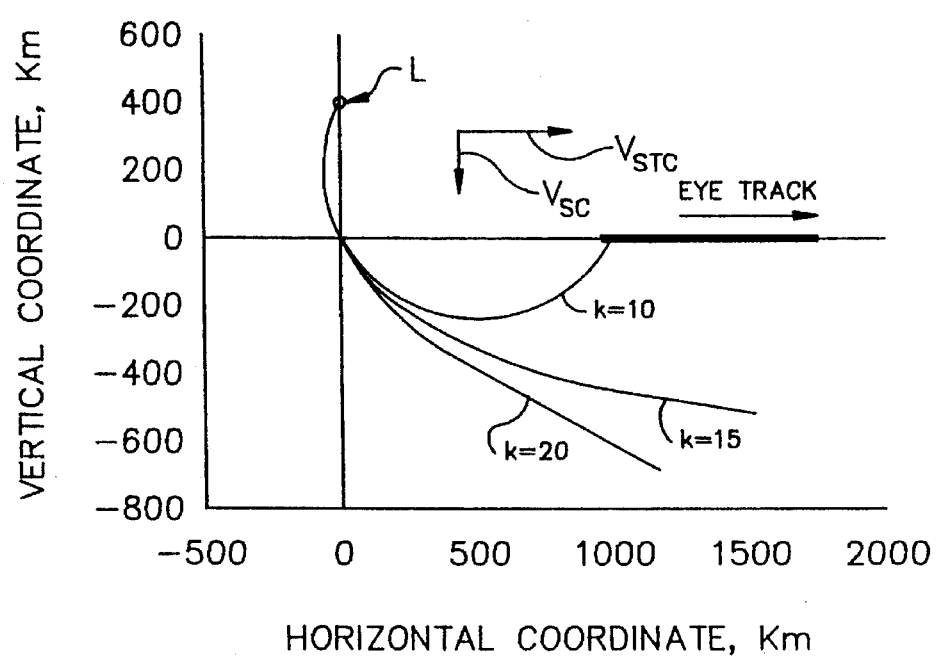
FIG. 12 illustrates in earth-fixed coordinates the spiral path of an airborne monitoring system according to the invention captured in a tropical cyclone.

FIGS. 11 and 12 illustrate an intercept and tracking path taken by monitoring system 10 when introduced into the concerted winds of a tropical cyclone. In FIG. 11 the course of the tropical cyclone is on a generally northwesterly path M in the southeastern Gulf of Mexico. As the storm passes by Key West, Florida windfoil system 10 is launched at a point L over the sea, on the winds of the tropical cyclone. It ascends rapidly to 500 to 1000 feet, then flies autonomously along path N until captured by the eye of the tropical cyclone. After capture, the system tracks along path MN while continuously measuring and transmitting meteorological data to, and receiving commands from, geographically remote ground, sea or airborne stations.

FIG. 12 shows on an enlarged scale the paths of monitoring system 10 having various drag ratios K. The system is launched at point L which is 400 km from the eye track of a tropical cyclone in a steering current $V_{stc} = 5$ m/sec parallel to the eye track and a sea current $V_{sea} = 1.5$ m/sec normal to the eye track. The graph demonstrates that systems with drag ratios K (i.e. $D_{CS}/(D_B - D_{CH})$ exceeding 10 are not captured in the eye of the tropical cyclone. Ideally, a drag ratio of K<2 is preferred.

Figure 13:
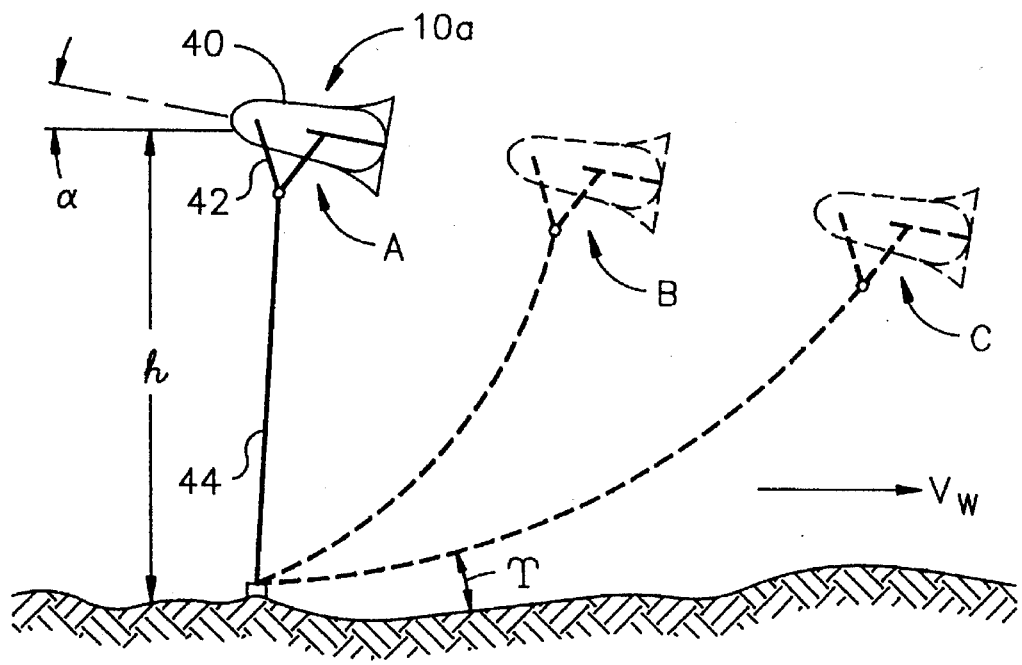
FIG. 13 represents in elevation another embodiment of an airborne monitoring system according to the invention tethered from a stationary ground site.

Referring now to FIG. 13, there is shown a stationary embodiment of the monitoring system 10a according to the invention in a no-wind position A, and in phantom outlined positions B and C in 50 fps and 250 fps winds, respectively. The system includes a lifting body 40 connected by a bridle 42 in a manner like the tracking configuration of FIG. 8, but instead of the lower end being free, a tether 44 suspended from bridle 42 is fixed at a ground location P. Since system 10a cannot drift with the wind, the relative velocity $V_R$ equals the wind speed $V_W$ and the angle $\gamma$ tether makes with the ground decreases as the wind speed increases.

The basic equations for the balance of forces in system in 10a in the vertical and horizontal directions are as follows:

$$\text{vertical: } B_{net} + L_B - W_C - D_{CV} - T\sin\gamma = 0 \quad (5)$$

$$\text{horizontal: } D_B + D_{CH} - T\cos\gamma = 0 \quad (6)$$

where T=tension in tether at ground level Applying the simplifying assumption as before, i.e. $D_{CH}$ and $D_{CV}$ are equal to zero, an equation for system performance can be derived. In this case, the equation for system altitude h becomes:

$$h = \frac{D_B}{\omega} \left[ \cosh\sinh^{-1}\left( \frac{B_{net} + L_B}{D_B} \right) - \cosh\sinh^{-1}\left( \frac{B_{net} + L_B - W_c}{D_B} \right) \right] \quad (7)$$

where
$D_B = \frac{1}{2}\rho_{SW} V_W^2 C_{DB} S$,
$L_B = \frac{1}{2}\rho_{SW} V_W^2 C_{LB} S$, and
$B_{net} = W_{PL}$ at no-wind condition.

Figure 14:
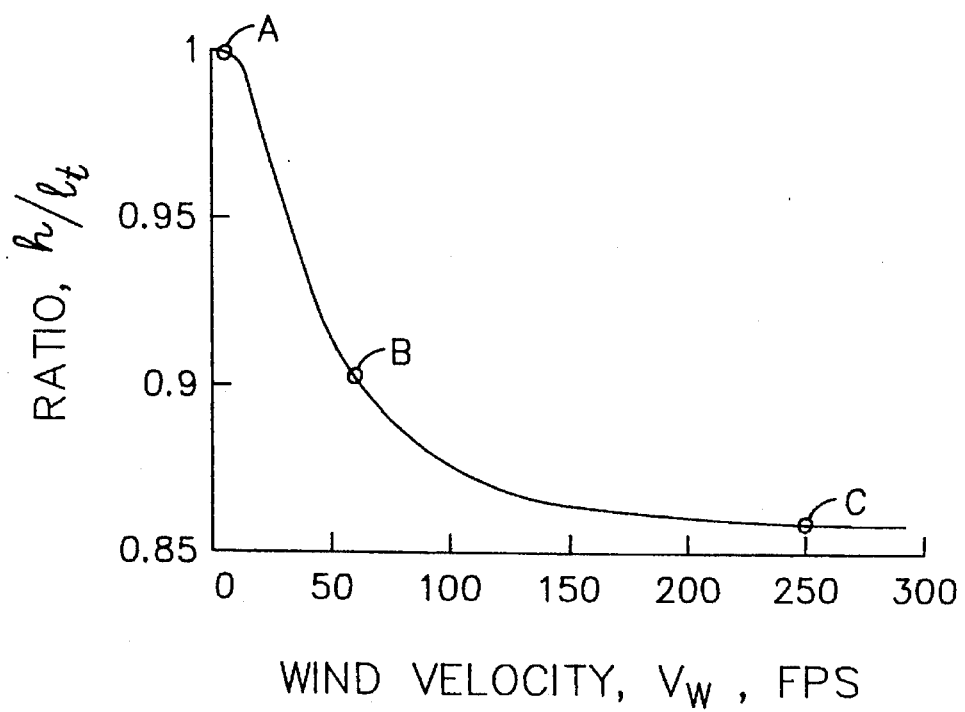
FIG. 14 shows a typical aerodynamic performance characteristic of the system of FIG. 13 designed according to the invention.

The performance characteristic of a system according to the above is illustrated in FIG. 14. For a given set of design conditions, it will be noted that the altitude h asymptotically approaches approximately 85% of the total tether length $l_t$ at position C for the strongest anticipated wind $V_W = 250$ fps. Typical atmospheric conditions for a tethered lifting body would keep it within 90% of its no-wind altitude. Of course, these values can be tailored by changing the envelope size and tether dimensions.

If the neglected vertical and horizontal drag components of the tether, $D_{CV}$ and $D_{CH}$, are included in a full numerical solution, the system in effect will settle at a slightly lower altitude, i.e. 3 to 10 percent lower depending on tether diameter and length.

Some of the many advantages and novel features of the invention should now be readily apparent. For example, an airborne method and apparatus for monitoring lower atmospheric boundary layer meteorological conditions is provided which is deployable such as on the winds of the tropical cyclone to fly autonomously into the eye and track the course of the eye as it measures and transmits meteorological data. In another embodiment, a lifting body tethered from a stationary ground location is disclosed which will maintain a substantially constant altitude under varying wind speeds. A simplified method of forming a streamlined envelope from a single plastic sheet is also provided.

In one embodiment, the system is especially designed to fly autonomously over water, land, or ice at low altitudes below 1000 feet. It is an unmanned, unpowered, lighter-than-air, inflated lifting body that flies on the wind, and maintains stable flight with a thin lightweight tether that drags across the surface below it. During calm winds the helium inflated envelope sustains altitude for the system.

The system differs from other lighter-than-air, unpowered craft, in that it can move like a free balloon in a free flying mode but, because of its aerodynamic and hydrodynamic properties, it flies at altitudes below 1000 feet. In the stationary flight mode, where the lower end of the tether is fixed, the system differs from a tethered balloon in that the lifting body, as used in free flight or tracking model, is shaped as a lifting surface and therefore maintains a substantially constant altitude within wide variations in wind speed. In this mode meteorological measurements can be made while flying in a tropical cyclone or other concerted atmospheric system. In the stationary or ground-tethered mode, the system can also make meteorological measurements.

It will be understood, of course, that various changes in the details, materials, steps and arrangement of parts, which have been herein described and illustrated in order to explain the nature of the invention, may be made by those skilled in the art within the principal and scope of the invention as expressed in the appended claims.

We claim:

1. An airborne monitoring system for tracking and observing meteorological conditions in the lower atmospheric boundary layer over a body of water, comprising, in combination:
  a lifting body;
  module means for sensing and transmitting the conditions to, and receiving commands from, a remote station;
  bridle means for suspending said module means below said lifting body; and
  a tether having one end attached to said bridle means and a lower portion at the other end deployable on the surface of the water, said tether being dimensioned to maintain said lifting body at a substantially constant altitude h under a variable wind speed.

2. A monitoring system according to claim 1 wherein: the altitude h is determined by the following relationship:

$$h = D_{cs}\left\{\cosh\left[\sinh-1\left(\frac{B_{net}+L_B\left(1-\frac{V_s}{V_w}\right)^2}{D_B\left(1-\frac{V_s}{V_w}\right)^2}\right)\right]-1\right\} \quad (4)$$

where:
  $D_{CS}$=tether drag in water,
  $B_{net}$=net buoyant force,
  $L_B$=lift of system,
  $D_B$=drag of system, and
  $V_s/V_w$=speed ratio of system-to-wind.

3. A monitoring system according to claim 2 wherein: the speed ratio $V_s/V_w$ is determined according to the following relationship:

$$z^4-2z^3+(1+a+b)z^2-2az+a=0$$

where $z=V_s/V_w$,
  $a=(2\omega/C_{DC}d\ V_w^2)(1/L/D)$,
  $b=2(B_{net}-\omega l_t)/\rho_{sea}C_{DB}S\ V_w^2$,
  $\omega$=tether weight per unit length,
  $C_{DC}$=tether drag coefficient,
  d=diameter of tether,
  L/D=lift-to-drag ratio,
  $l_t$=tether length in water,
  $\rho_{sea}$=density of water,
  $C_{LB}$=wing surface area.

4. A monitoring system according to claim 1 wherein: said lifting body includes a helium-filled envelope characterized by a midsection of uniform circumference lengthwise and oblate spheroidal nose and tail sections aligned along a common longitudinal axis.

5. A monitoring system according to claim 4 wherein: said nose section defines a major axis and a minor axis in horizontal and vertical planes, respectively, through the longitudinal axis for providing lift and vertical stability, and said tail section defines a major axis and a minor axis in vertical and horizontal planes, respectively, through the longitudinal axis for providing yaw stability.

6. A monitoring system according to claim 5 wherein: the cross sectional area of said nose section is greater than the cross sectional area of said tail section.

7. A monitoring system according to claim 6 wherein: the major-to-minor axes ratio of said nose section is about 1.36;
the major-to-minor axes ratio of said tail section is about 1.40; and
the ratio of envelope length to the major axis of said nose section is about 5.1.

8. A monitoring system according to claim 1 wherein:
said lifting body includes a gas filled envelope; and
said lifting body further includes delta wings attached to opposite sides of a tail portion of said envelope for lift and stability.

9. A monitoring system according to claim 8 wherein:
a ratio of total span of said wings to length of said envelope is about 0.78;
an aspect ratio of said wings is about 2.0; and
a sweep angle of said wings is about 63.4°.

10. A monitoring system according to claim 1 wherein:
said lifting body includes a gas filled envelope; and
said bridle means includes a pair of lines attached at respective one ends to forward points on opposite sides of said envelope and at respective other ends to aftward points on opposite sides of said envelope, and each of said lines converging intermediate the ends thereof to a common point at said module means.

11. A monitoring system according to claim 10 wherein:
each of said lines between the forward and common points has a length greater than between the aftward and common points to provide a preselected angle of attack of said lifting body.

12. A monitoring system according to claim 11 wherein:
a ratio of length of said bridle means to length of said envelope is about 2.28; and
a ratio of confluence of said bridle means to length of said envelope is about 0.34, wherein the confluence is a horizontal distance between the forward tip of said envelope and the common point.

13. A monitoring system according to claim 12 wherein:
each of said lines between the forward and common points has a length about 28.08 feet; and
each of said lines between the aftward and common points has a length about 26.5 feet.

14. A monitoring system according to claim 10 further comprising:
attachment means interconnecting each of said lines respectively at the common point to said module means for adjusting the relative lengths of said lines from the common point to the forward and aftward points.

15. A method for maintaining an autonomously flying hybrid lifting body in an airstream over water, the lifting body having a lifting force at a preselected altitude within a range of wind speeds, comprising the steps of:
attaching one end of a tether means to the lifting body, said tether means including a cord of specific gravity less than one when saturated in water; and
deploying the lifting body over the water with an upper segment of said cord suspended in the airstream and a lower segment of said cord floating on the surface of the water, the weight and aerodynamic force of said upper segment in the airstream and the hydrodynamic force of said lower segment on the water providing a force balance with the lifting force of said lifting body.

16. A method according to claim 15 further including the step of:
receiving information from, and transmitting commands to, the body while in flight.

17. An airborne monitoring system deployable over a body of water comprising, in combination:

- a lifting means for providing a lifting force in an airstream;
- monitor means depending from said lifting means for observing meteorological conditions; and
- a tether means including a cord of specific gravity less than one when saturated in water depending from said monitor means, said cord having an upper segment deployable in the airstream and a lower segment deployable on the surface of the water for maintaining said lifting means and said monitor means in the lower atmospheric boundary at a substantially constant altitude.

18. An airborne system according to claim 17 wherein:

said lifting means includes a helium-filled envelope characterized by a midsection of uniform circumference lengthwise and oblate spheroidal nose and tail sections aligned along a common longitudinal axis, said nose section defining a major axis and a minor axis in horizontal and vertical planes, respectively, through the longitudinal axis for providing lift and vertical stability, and said tail section defining a major axis and a minor axis in vertical and horizontal planes, respectively through the longitudinal axis for providing yaw stability.

* * * * *